July 30, 1957     H. H. ARMSTRONG     2,800,699
END STOP AND SEAL FOR SLIDE FASTENER STRUCTURE
Filed Aug. 22, 1955     2 Sheets-Sheet 1
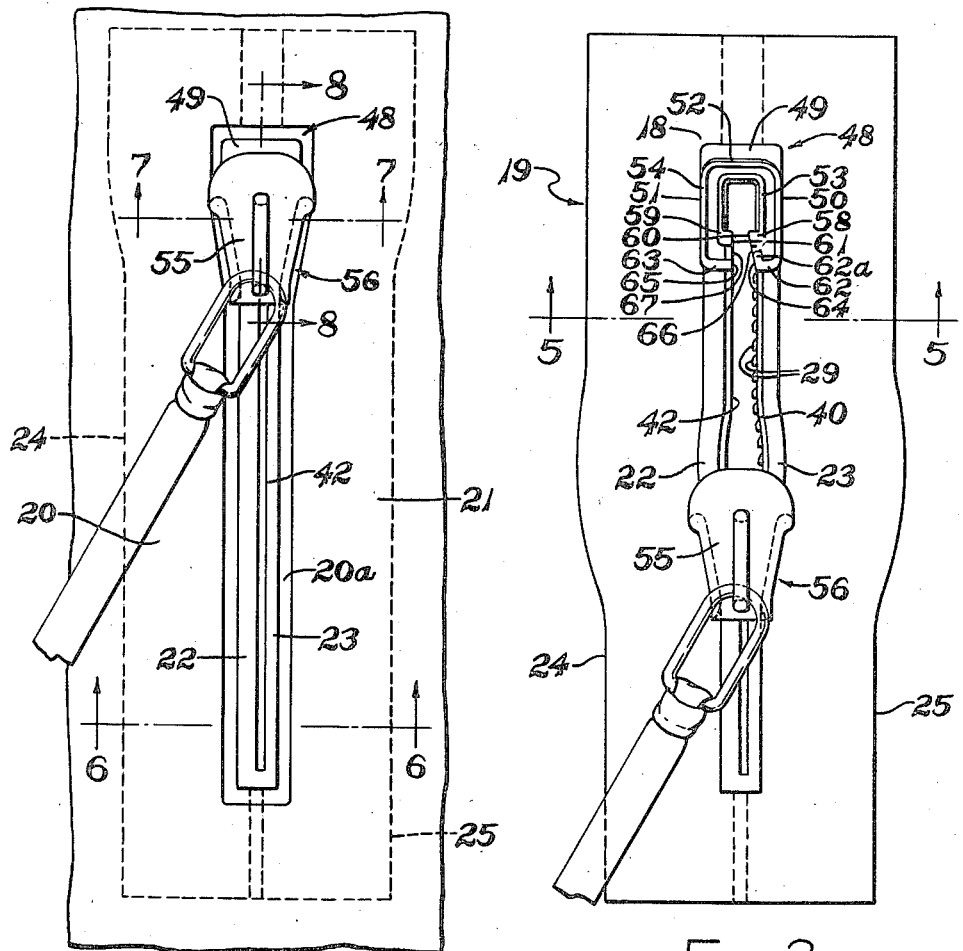
Fig.1     Fig.2
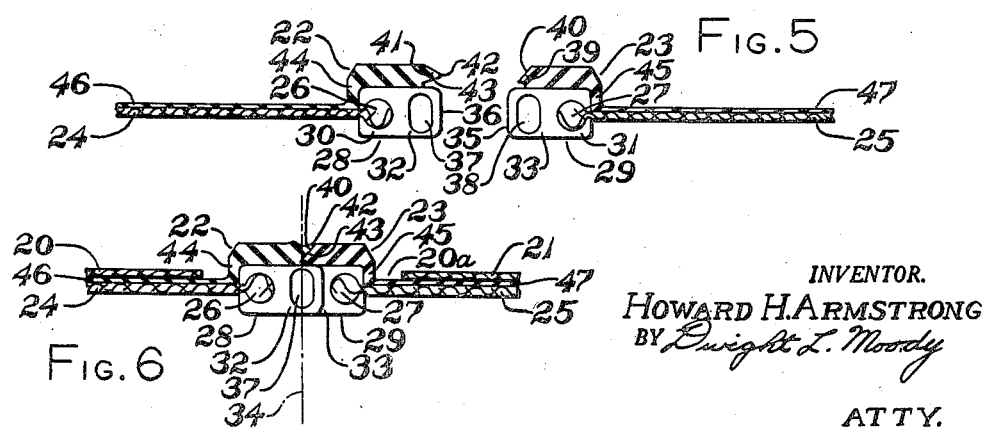
Fig.5
Fig.6
INVENTOR.
HOWARD H. ARMSTRONG
BY Dwight L. Moody
ATTY.

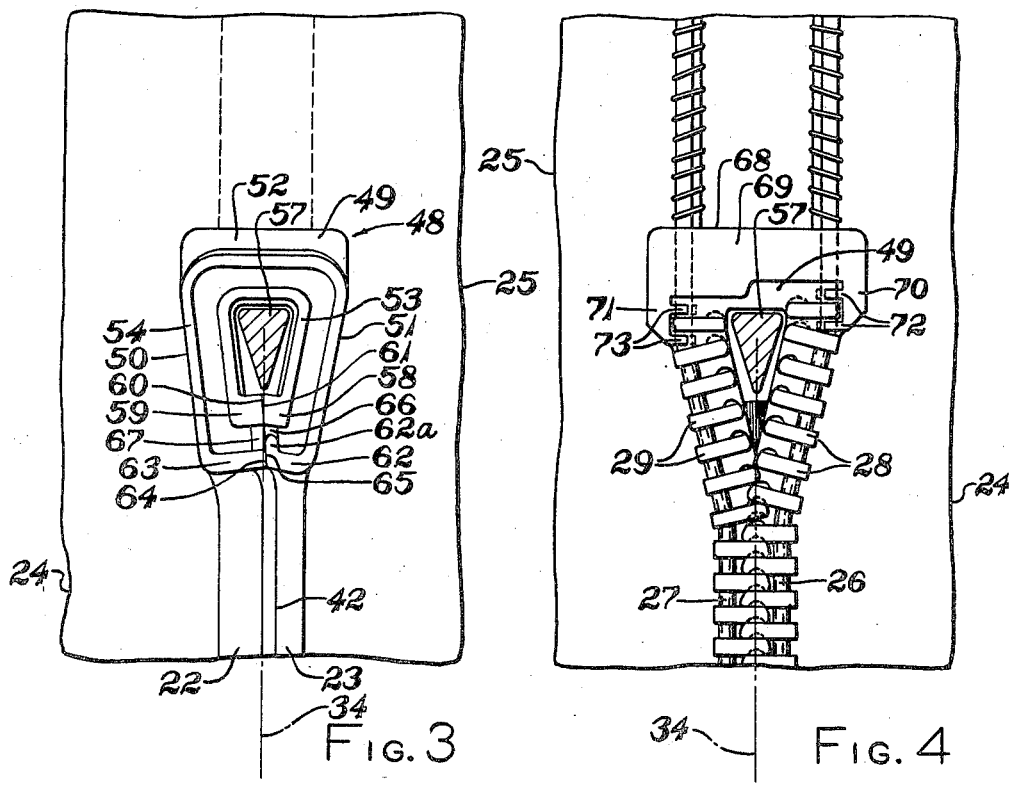

United States Patent Office 2,800,699
Patented July 30, 1957

2,800,699

END STOP AND SEAL FOR SLIDE FASTENER STRUCTURE

Howard H. Armstrong, Cuyahoga Falls, Ohio, assignor to The B. F. Goodrich Company, New York, N. Y., a corporation of New York Application August 22, 1955, Serial No. 529,621

8 Claims. (Cl. 24—205.1)

The invention relates to sealing closures and especially to sealing end closures for slide fastener structures of the sealing type.

The sealing slide fastener structure described and shown in this application but excluding the end stop and seal of this invention is claimed in a copending application of Howard H. Armstrong and Carroll P. Krupp, Serial No. 528,153, filed August 15, 1955.

Objects of the invention are to provide for an effective outward or vertical compression and abutting pressure seal continuously around i. e. about an end of a fastener structure in continuation of a fluid-tight seal along the said fastener structure; to provide for a multiple or labyrinthian outward compression seal about said end of the fastener structure; to provide for outward compression together with lateral abutment type sealing at an end of a slide fastener structure and for accommodating a closing member or slider or runner at said end; to provide for preventing movement of the slider or runner of the fastener structure beyond said end and for registering and maintaining the fastener elements of the fastener structure in proper alignment; to provide for preventing breakage of the end seal by resisting accidental movement of the closing member or slider away from said end of the fastener structure; to provide for accommodating the end sealing means within the slider in the closed condition of the fastener structure; to provide for maintaining the slider pressed firmly against a resilient sealing body at said end of the fastener structure; to provide for localized lateral flexure of side portions of the said sealing body with little or no flexure of adjoining parts of the body; to provide for positively registering and aligning the top end teeth of the fastener structure; and to provide for simplicity of construction, convenience of manufacture and for effectiveness of operation.

These and other objects and advantages of the invention will be apparent from the following description.

In the accompanying drawings which form a part of this specification and in which like numerals are employed to designate like parts throughout the same, Fig. 1 is a plan view of a sealing slide fastener closure including a top end stop and seal in the wall of an article and constructed in accordance with and embodying the invention, parts being broken away.

Fig. 2 is a plan view from above of a sealing slide fastener structure including the top end stop and seal before attachment to the wall and in a partially open condition, Fig. 3 is a view like Fig. 2 but in an enlarged scale with the fastener structure in its closed condition and with the upper plate of a slider removed, parts being broken away and in section, Fig. 4 is a plan view from below of the closed fastener structure shown in Fig. 3 with the lower plate of the slider removed, parts being broken away and in section, Fig. 5 is a sectional view taken along line 5—5 in Fig. 2,
Fig. 6 is a sectional view taken along line 6—6 in Fig. 1,
Fig. 7 is a sectional view taken along line 7—7 in Fig. 1,
Fig. 8 is a sectional view taken along line 8—8 in Fig. 1, and Fig. 9 is a perspective view of a stop member for the top end of the fastener structure.

In the illustrative form of the invention shown in the drawings, the sealing closure includes a slide fastener structure 19 of the fluid-tight, pressure sealing type described, shown and claimed in the said copending application of Howard H. Armstrong and Carroll P. Krupp, which slide fastener structure is useful especially for closing effectively adjacent separable flexible margins 20, 21 at an aperture or slot-like opening 20a in the wall of an article such, for example, as footwear, clothing, a tent, an inflatable container or other inflatable article, a protective covering for apparatus and the like, and other manufactured articles requiring closing of the margins 20, 21 against the passage of fluid, i. e. a liquid or a gas, and of other flowable foreign matter therebetween. It is necessary to provide a seal at both ends of the aperture or slot-like opening 20a as well as along the the margins 20, 21 at the aperture and the present invention is directed especially to the feature of means for sealing effectively the top or closed end portion, indicated by the numeral 18, of the slide fastener structure.

The slide fastener structure 19, as shown especially in Figs. 1 and 2, has a pair of flexible attaching margins or stringers 24, 25 for attachment as by a suitable adhesive or other fastener means, to the margins 20, 21 to be joined, which stringers may be made of square-woven, knitted or other suitable textile fabric of cotton, nylon, rayon, silk, glass fibers or other suitable filamentary material. The stringers 24, 25 which carry flexible sealing elements or strips 22, 23 of elastic material, have beaded marginal edges 26, 27 upon which are mounted cooperating slide fastener elements or teeth 28, 29 of known construction and hard, stiff material such, for example, as brass or bronze, aluminum alloy, steel or other suitable metal, or a rigid nylon or other suitable strong, heat-resistant plastic material. Each of the teeth 28, 29 includes a mounting portion 30, 31 immediately at the beaded marginal edge 26, 27 and an engaging portion 32, 33 projecting therefrom. The engaging portions 32, 32 of the teeth 28, 28 on one stringer 24 are positioned in the spaces between and overlap the engaging portions 33, 33 of the teeth 29, 29 on the other stringer 25, and also contact and detachably interlock with the engaging portions 33, 33 along the longitudinal center line, i. e. median line of engagement, indicated by the numeral 34, of the slide fastener structure in its closed condition. The median line 34 is located centrally of the interlocking contact areas 37, 38 of the engaging portions 32, 33 of the engaged teeth 28, 29 and is substantially equally spaced laterally from the free ends 35, 36 of the engaged teeth.

The flexible sealing elements 22, 23 of impervious elastic material are desirably made of resilient rubber, natural or synthetic, or other elastic rubber-like material or elastic thermoplastic material suitable for the intended purpose and capable of being extruded or molded or otherwise formed to shape, and also capable of being securely adhered or bonded as by a suitable rubber cement, or otherwise attached to the teeth 28, 29 of the slide fastener structure. Both sealing elements 22, 23 extend longitudinally in continuous strip form at a face of the attaching margins or fabric stringers 24, 25, and are mounted not only on the fabric stringers but also mounted directly on the teeth 28, 29, so as to overlap and overlie the mounting and the engaging portions of the teeth. In the preferred construction the sealing elements 22, 23 are made of resilient, natural or synthetic rubber composition, and are molded upon and adhesively bonded as by a suitable rubber cement to the upper faces of the teeth 28, 29. The longitudinal sealing element 23 extends laterally of the closure i. e. lengthwise of the teeth 29, 29 from their outer end to at least the position of the median line 34 and preferably to a position slightly beyond the median line, and has a relatively narrow, flexure-resistant tapered marginal portion 39 overlying in part the interlocking contact area 37 and terminating slightly beyond the median line 34 to provide for the desired lateral interference of the sealing elements to produce lateral abutting pressure of one element against the other. The sealing element 23 is adhesively attached or bonded to the upper face of the teeth 29, 29 at their mounting portions and preferably also at their engaging portions which thereby brace or stiffen the tapered marginal portion 39. The inclined, inner side face, that is, the upper face of the tapered marginal portion 39 of the sealing element 23 constitutes a smooth, planar, continuous seating surface 40 for contacting the other sealing element 22. The seating surface 40 extends laterally outward of the closure and upwardly inclined at an acute angle such, for example, as 50° relative to the adjacent face of the stringers 24, 25, and extends laterally in a direction away from the median line 34 with its major part disposed to one side of a vertical plane passing through the median line 34. The sealing element 23 may be of flat strip form of uniform thickness with a flat upper face rearward of the seating surface and with an outwardly extending, laterally inwardly inclined outer side face for slider clearance purposes.

The other sealing element 22 is mounted directly upon and adhesively bonded to the teeth 28, 28 in a manner substantially like that of the sealing element 23 upon the teeth 29, 29. The sealing element 22 extends laterally of the closure from the outer end of the teeth 28, 28 to the inner end thereof, that is, the free end of the engaging portions 32, 32 of the teeth; and has a relatively narrow, flexible, tapered marginal portion 41 of greater flexibility than that of the marginal portion 39, projecting away from the median line 34 toward the seating surface 40 in overlying, spaced-apart relation to the underlying engaging portions 32, 32 and disposed to the same side of the median line 34 as the seating surface 40 of the sealing element 23 to provide for lateral interference of the sealing elements. The marginal portion 41 presents a thin, flat edge 42 to the seating surface, which edge overlies the free ends of the engaging portions 32, 32, and the marginal portion 41 provides at its lower face a continuous, planar, smooth sealing surface 43 extending from a position closely adjacent and slightly beyond the median line 34 to and intersecting with the edge 42. The sealing surface 43 extends in overlying, spaced-apart, outwardly inclined relation to the engaging portions 32, 32 and to the adjacent face of the stringers, and is inclined relative to the seating surface for angular interference therewith. The sealing surface 43 is inclined at a lesser angle than that of the seating surface, and is inclined, for example, at an angle of 15° relative to the adjacent face of the stringers, whereby the angular interference with the 50° seating surface is 35. This preferred arrangement advantageously produces effective initial contact and subsequent follow-through contact of the sealing elements 22, 23, and effective lip-action and also lateral abutting pressure sealing even under hinging and flexure of the slide fastener structure.

Relatively thin, impervious end walls 44, 45 of suitable resilient rubber material are bonded to the outer end faces of the teeth 28, 29 and are in continuation of the sealing elements 22, 23 and of thin impervious layers 46, 47 of suitable resilient rubber material on and suitably adhered to the adjacent face of the fabric stringers 24, 25 to prevent leakage of the closure. The ends of the sealing elements 22, 23 at the lower end of the slide fastener structure 19 are suitably adhered and joined together in sealing relation. A suitable closing member or slider 56 having its upper plate 55 arranged closely about the exterior of the sealing elements is provided to engage and disengage the slide fastener teeth and to draw the sealing elements laterally together into sealing contact one to the other, and is shown and described more fully in the said copending application of Howard H. Armstrong and Carroll P. Krupp.

The invention provides at the top or closed end portion 18 of the slide fastener structure 19, a sealing end closure means and a top stop means constituting an end closure assembly 48. The sealing end closure means includes a flexible body 49 of suitable elastic impervious material, preferably suitable resilient rubber material, desirably formed or molded integral with and in continuation of the sealing elements 22, 23. The resilient body 49, as formed or molded, has an open loop shape or a generally U-shaped configuration-in-plan, and preferably not greater than the thickness of the sealing elements as for reduced height, increased flexibility and limited elastic deformation purposes. The U-shaped body 49 is carried by the fabric stringers 24, 25 and mounted upon and adhesively bonded to several of the longitudinally spaced end teeth on each of the laterally spaced fabric stringers and at said adjacent face of the stringers; and covers the outer end faces of such end teeth so as to seal the same and be in continuation of the impervious layers 46, 47 on the stringers. Flexible side or leg portions 50, 51 of the U-shaped body extend longitudinally and slightly divergingly away from the ends of the sealing elements and merge with a relatively wider but shorter intermediate or base portion 52 of the said body 49 laterally spanning the space between the fabric stringers 24, 25. The relatively thin, U-shaped body 49 is adapted to flex laterally along at least part of its leg portions 50, 51 and to fit within the slider 56 in elastic conformance thereto.

The U-shaped body 49 at its flat upper face has projecting outwardly or vertically upward therefrom a pair of similarly upraised or upright and narrow, continuous sealing ribs or ridges 53, 54 extending in spaced-apart substantially parallel relation one to the other along each of the leg portions 50, 51 and then continuing along the base portion 52. The inner and outer sealing ribs 53, 54 are desirably of equal height relative to the flat upper face of the body 49 and are each of sufficient height, stiffness and width to remain inherently upright in stable opposition to the opposite plate 55 of the slider and to provide a seal preferably of substantial width (greater than line contact) along the rib under compression of the latter by virtue of its interference with the flat, smooth, planar, inner surface of the side flanged upper plate 55 of the closing member or slider or runner 56.

The inner sealing rib 53 of U-shaped configuration is positionable nearest and about the periphery of a spreader post 57 of the slider 56, the post 57 extending vertically between the upper plate 55 and a substantially similar lower plate of the slider and having a generally triangular shape in cross-section with the base of the triangle positionable nearest the base portion 52 of the body 49. The ends of the legs of the sealing rib 53 nearest the mouth of the body 49 are desirably enlarged laterally inward to provide relatively wider and laterally stiffer abutments or shoulder portions 58, 59 with adjacent opposed surfaces 60, 61 thereof diverging away from the mouth toward the base of the U, so that in the closed condition of the sealing end closure the opposed surfaces 60, 61 abut and laterally press sealingly against one another at and along the median line 34, as shown especially in Fig. 3.

The outer sealing rib 54 of U-shaped configuration has its leg parts extending along and immediately at and merging with the outer side faces of the leg portions 50, 51 of the body 49, and aligned with and extending in continuation of the outer side faces of the sealing elements 22, 23. At the junctions of the body 49 and the sealing rib 54 with the sealing elements, the sealing rib 54 has end portions 62 and 63 extending laterally entirely across the ends of the respective sealing elements and extending upwardly to a height slightly above the upper faces of the sealing elements 22, 23. One of the laterally extending end portions 62 at its inner end region has a short end part 62a disposed longitudinally and extending in continuation of the seating surface 40 of the sealing element 23 to provide a relatively stiff vertical surface 64 inclined toward the shoulder 58 and the median line 34 and offset to one side of the median line 34. The vertical end face 65 of the other end portion 63 sealingly presses and abuts against the surface 64 at said one side of the median line and immediately at the position of the lip-action seal in the closed condition of the sealing end closure. The short inner margins 66, 67 of the body 49 interconnecting the shoulder portions 58, 59 and the ends of the lateral end portions 62, 63 may be slightly thickened for increased stiffness and abutting contact and good molding purposes.

In the closed condition of the sealing end closure means, as shown in Fig. 3, the resilient U-shaped body 49 being within the slider 56 has its leg portions 50, 51 flexed elastically and laterally to conform to the shape of the upper plate 55 of the slider 56 and the inner and outer sealing ribs 53 and 54, respectively, are in an elastically deformed or compressed condition and outwardly press and abut sealingly against the upper plate of the slider. The shoulders 58, 59 of the inner rib 53 at the front of the spreader post 57 have their opposed surfaces 60, 61 sealingly abutting one another along the median line 34, while the surfaces 64, 65 of the end portions 62, 63 of the outer rib 54 are sealingly abutting at the position of the lip seal of the sealing elements and at a position offset to one side of the median line, and the thickened inner margins 66, 67 of the body 49 may be also in abutment.

This provides desirable continuity of lateral abutment sealing longitudinally along the front or mouth end regions of the leg portions 50, 51 of the body, and in continuation of the lip seal along the sealing elements 22, 23. At the same time, each sealing rib 53, 54 in its vertically compressed condition continuously seals against the upper plate of the slider 56 to produce a multiple compression seal. The outer rib 54 due to its vertically compressed state at its lateral end portions 62, 63, produces some crowding and elastic deformation of the resilient rubber material of the body 49 and of the end parts of the sealing elements 22, 23 immediately at their junction with the body 49. This crowding and elastic deformation facilitates maintaining unbroken the seal of the closure in its transition from the lip-action of the sealing elements to the multiple vertical compression seal and the lateral abutment seals of the sealing end closure means.

A top stop means or member 68 of stiff metal such, for example, as brass or bronze sheet material of suitable thickness is desirably mounted on the fabric stringers at the other face thereof, so as to underlie and backingly support the base portion 52 of the resilient U-shaped body 49 and desirably the rear parts only of the leg portions 50, 51. The top stop member 68 may be generally U-shaped in plan with a relatively wide, continuous base portion 69 and relatively short and narrow leg portions 70, 71 dependent from the base portion 69 to extend along the fabric stringers at the several end teeth 28, 29 thereon. Each of the leg portions 70, 71 has a pair of longitudinally spaced-apart projections 72, 72 and 73, 73, respectively, extending laterally inward toward the opposite leg portion and offset longitudinally relative to the other pair of projections. Each projection 72, 73 is of a width to extend in the space between mounting portions of adjacent end teeth on a fabric stringer, and each projection 72, 73 has its free end portion bent vertically upward to engage the beaded marginal edge of the stringer and be disposed between adjacent end teeth. The top stop member 68 is desirably bonded adhesively to the fabric stringers and the teeth and to the base portion 52 of the resilient U-shaped body 49 and facilitates maintaining the lateral spacing between the end parts of the fabric stringers. The offset arrangement of the projections 72, 73 and their positioning between adjacent end teeth advantageously registers the several end teeth in proper lateral alignment, to facilitate the alignment and the engagement and disengagement of the remaining teeth along the sealing slide fastener.

In the operation of the sealing closure, the slider 56 is moved slidably and longitudinally along the fabric stringers 24, 25 toward the top end at 18 and in engagement with the teeth 28, 29 and the exterior of the sealing elements 22, 23 to effect closing of the slide fastener structure. This draws the teeth laterally together into interlocking contacting relation at their engaging portions, and also draws the sealing elements laterally together, whereby the thin flat edge 42 resiliently presses against and slidably contacts the acutely inclined seating surface 40 of the sealing element 23 at one side of the median line 34 and the lesser inclined sealing surface 43 laterally presses and conformingly abuts against the seating surface 40 in slidable sealing relation thereto under the influence of the resilient bending flexure and elastic deformation of the tapered marginal portion 41 of the sealing element 22 resulting from the lateral interference of the sealing elements and the angular interference of the sealing surface 43 and the seating surface 40. Thus, there is a lip-action seal effected by the edge 42 together with a lateral abutting pressure seal effected by the sealing surface against the acutely inclined seating surface continuously along the fabric stringers to the sealing end closure means.

At the juncture of the sealing elements 22, 23 with the U-shaped body 49 and the outer sealing rib 54, there is provision for an unbroken transition from the lip and lateral abutting pressure seal of the sealing elements to the primary vertical compression seal of the respective sealing ribs 53, 54 against the upper plate 55 of the slider 56 and to the secondary lateral abutment seal at the shoulders 58, 59 of the inner rib 53 and at the surfaces 64, 65 of the lateral end portions 62, 63 of the outer rib 54 and at the inner margins 66, 67, when the slider 56 is enclosing the body 49 and its ribs 53, 54 and is disposed at the top end at 18 of the sealing closure, as shown in Figs. 1 and 3. Longitudinal movement of the slider 56 beyond the desired end position is prevented effectively by the top stop member 68, at which position the spreader post 57 of the slider extends through the triangular opening bounded by the U-shaped body 49 in its flexed condition. The frictional resistance provided by the resiliently compressed sealing ribs 53, 54 prevents accidental movement of the slider 56 away from the sealing end closure and hence breakage of the top end seal.

Moving the slider longitudinally away from the top end and along the fabric stringers breaks the top end seal and the seal along the sealing elements while disengaging the teeth and laterally separating the sealing elements, thus opening the sealing closure.

Variations may be made without departing from the scope of the invention as it is defined in the following claims.

I claim:

1. A sealing closure for adjacent margins having a slot-like opening between them terminating in a closed end, said closure comprising fastener means for detachably securing said margins one to the other and including a closing member movable along said opening and positionable at said end, flexible sealing elements extending along said margins at a face thereof and terminating at said end, and a sealing body of flexible material extending continuously around said end in continuation of and integral with the adjacent ends of said sealing elements, said sealing body having spaced-apart side portions extending away from said ends of the sealing elements and along said margins and an intermedaite portion interconnecting said side portions remote from said ends of the sealing elements and extending laterally between said margins, said sealing body having a sealing rib of elastic material projecting outwardly therefrom to a greater height than said sealing elements relative to said face of the margins for interference with and for pressing in an elastically compressed state outwardly against an interior seating surface of said closing member, said sealing rib presenting end faces at opposed inside surfaces of said side portions for sealing contact of one end face against the other, and extending laterally away from said end faces and said opposed inside surfaces across at least part of said side portions immediately at said ends of the sealing elements and continuing along said side portions to and then along said intermediate portion to provide a continuous compression seal against said interior seating surface of said closing member continuously about said closed end and in unbroken continuation of the seal of said sealing elements along said margins in the closed condition of the sealing closure.

2. A sealing closure for adjacent margins having a slot-like opening between them terminating in a closed end, said closure comprising fastener means for detachably securing said margins one to the other and including a closing member movable along said opening and positionable at said end, flexible sealing elements extending along said margins at a face thereof and terminating at said end, and a sealing body of flexible material extending continuously around said end in continuation of and integral with the adjacent ends of said sealing elements, said sealing body having spaced-apart side portions extending away from said ends of the sealing elements and along said margins and an intermediate portion interconnecting said side portions remote from said ends of the sealing elements and extending laterally between said margins to provide inside and outside peripheral surfaces of the body along the side and intermediate portions thereof, said sealing body having an inner and an outer sealing rib of elastic material each projecting outwardly therefrom to a greater height than said sealing elements relative to said face of the margins for interference with and for pressing in an elastically compressed state against an interior seating surface of said closing member, said outer sealing rib presenting end faces at opposed inside peripheral surfaces of said side portions for sealing contact of one end face against the other, and extending laterally away from said end faces and said opposed inside peripheral surfaces immediately at said ends of the sealing elements to substantially the outer peripheral surfaces of said side portions and continuing along said side portions adjacent the outer peripheral surfaces thereof to and then along said intermediate portion adjacent the outer peripheral surface thereof, said inner sealing rib having end portions adjacent and longitudinally spaced from said outer sealing rib and from said ends of the sealing elements with opposed faces of said end portions at the inside peripheral surfaces of said side portions for sealing contact of one opposed face against the other, said inner sealing rib extending along said side portions to and then along said intermediate portion adjacent the inner peripheral surfaces thereof, said inner and outer sealing ribs each being adapted to provide an individual continuous compression seal against said interior seating surface of the closing member continuously about said closed end with the compression seal of the outer sealing rib being in unbroken continuation of the seal of said sealing elements along said margins in the closed condition of the sealing closure.

3. A sealing closure comprising slide fastener means having separable attaching margins of flexible material and terminating in an end portion, slide fastener elements at adjacent edges of said margins, a slider movable along said margins and positionable at said end portion in the closed condition of the fastener means, flexible sealing elements extending along said margins at a face thereof and terminating at said end portion and disposable in overlapping contacting sealing relation one to the other along said margins in said closed condition of the fastener means, and a sealing body of elastic material and generally U-shaped configuration mounted on said margins at said face thereof and extending continuously around said end portion in continuation of and integral with the adjacent ends of said sealing elements, said body having a base portion remote from said ends of the sealing elements extending laterally between said margins and having leg portions extending away from said base portion along said margins to and merging with said ends of the sealing elements, said body having a sealing rib of said elastic material projecting outwardly therefrom to a height greater than that of said sealing elements relative to said face of the margins for interference with and for pressing in an elastically compressed state against the interior surface of a plate of said slider, said sealing rib presenting end faces at opposed inside surfaces of said leg portions for sealing contact of one end face against the other, and extending laterally away from said end faces and the opposed inside surfaces across said leg portions immediately at said ends of the sealing elements and continuing along said leg portions to and then along said base portion to provide a continuous compression seal against said plate of the slide continuously about said end portion and in unbroken continuation of the seal of said sealing elements along said margins in the closed condition of the fastener means.

4. A sealing closure as defined in claim 3 in which a stop element of stiff material is mounted on said attaching margins at the other face thereof and at said end portion, said stop element extending laterally between said margins in underlying backing relation to said base portion of said sealing body and having dependent portions extending along said margins in underlying bracing relation to parts of said leg portions nearest said base portion, said dependent portions each having a pair of longitudinally spaced-apart projections extending laterally inward toward the other dependent portion and terminating in bent ends and offset longitudinally relative to the projections of said other dependent portion, said projections including their bent ends engaging said margins at said adjacent edges thereof and being disposed in the spaces between adjacent slide fastener elements at said end portion for registering and maintaining said slide fastener elements in proper alignment.

5. A sealing closure as defined in claim 3 in which said sealing body has said sealing rib thereof extending laterally away from said end faces and said opposed inside surfaces entirely across said leg portions immediately at said ends of the sealing elements and continuing along said leg portions at the outer side surfaces thereof and then along said base portion adjacent the outer side surface thereof; and in which said flexible sealing body has a second sealing rib of elastic material projecting outwardly therefrom to a height substantially equal to that of the first said sealing rib and having end portions with opposed faces adjacent and longitudinally spaced from the first said sealing rib and from said ends of the sealing elements and at the inside surfaces of said leg portions for sealing contact of one opposed face against the other, said second sealing rib including said end portions thereof extending along said leg portions at the inside surfaces thereof and continuing along said base portion at the inside surface thereof, each sealing rib being adapted to provide an individual continuous compression seal against said interior surface of said plate of the slider continuously about said end portion with the compression seal of said first said sealing rib being in unbroken continuation of the seal of said sealing elements along said attaching margins in the closed condition of the sealing closure.

6. A sealing closure comprising slide fastener means having separable attaching margins of flexible material and terminating in an end portion, slide fastener elements at adjacent edges of said margins, a slider movable along said margins and positionable at said end portion in the closed condition of the fastener means, sealing elements of resilient rubber-like material extending along said margins at a face thereof and mounted directly upon said slide fastener elements and terminating at said end portion, one of said sealing elements having a seating surface extending laterally of the closure in a direction away from the longitudinal center line thereof and disposed to one side of said center line and extending outwardly inclined at an acute angle relative to said face of the margins, the other sealing element having a flexible tapered marginal portion presenting a thin edge to said seating surface and having a sealing surface extending laterally in said direction and disposed to said one side of said center line in inclined relation to said seating surface with said sealing surface inclined relative to said face of the margins at a lesser angle than that of said seating surface for angular interference therewith and continuing to said thin edge to provide a lip seal by flexure of said edge in sliding contact against said seating surface while opposing areas on the acutely inclined seating surface and on said sealing surface at said one side of the center line are maintained pressed toward and against one another in slidable laterally abutting sealing relation in the closed condition of the fastener means, and a flexible sealing body of resilient rubber-like material and generally U-shaped configuration mounted on said margins at said face thereof and extending continuously around said end portion in continuation of and integral with the adjacent ends of said sealing elements, said sealing body having a base portion remote from said ends of the sealing elements extending laterally between said margins and having leg portions extending away from said base portion along said margins to and merging with said ends of the sealing elements, said sealing body having a sealing rib of said resilient rubber-like material projecting outwardly therefrom to a height greater than that of said sealing elements relative to said face of the margins for interference with a plate of said slider and for pressing in an elastically compressed state against the interior surface of said plate, said sealing rib presenting end faces at opposed inside surfaces of said leg portions for sealing contact of one end face against the other at the position of said lip seal of said thin edge against said seating surface immediately at said ends of the sealing elements and continuing along said leg portions to and then along said base portion to provide a continuous compression seal against said plate of said slider continuously about said end portion and in unbroken continuation of the lip seal of said sealing elements along said margins in the closed condition of the fastener means.

7. A sealing closure as defined in claim 6 in which said one of said sealing elements has said seating surface thereof outwardly inclined at an angle of about 50° to said face of the margins, and said other sealing has said sealing surface thereof outwardly inclined at an angle of about 15° to said face of the margins, both said sealing elements being adhesively bonded to the underlying faces of said slide fastener elements; and in which said sealing body has a second sealing rib of said resilient rubber-like material projecting outwardly therefrom to a height greater than that of said sealing elements relative to said face of the margins for sealing against said plate of said slider and extending continuously along said leg portions and said base portion at the inner sides thereof in inwardly spaced relation to the first said sealing rib and having end portions adjacent and longitudinally spaced from said end faces of the first said sealing rib and from said ends of said sealing elements, said end portions being of increased stiffness laterally of the rib relative to the remainder of said second sealing rib and presenting opposed inner side faces for sealingly abutting against one another in the closed condition of the closure.

8. A sealing closure as defined in claim 6 in which said slider has said plate thereof having a flat inner surface and having dependent side flanges extending at least part way along the sides of said plate in diverging relation one to the other, and said plate being disposed in adjacent overlying relation to the exterior surfaces of said sealing elements and in adjacent overlying relation to the outer sides of said leg portions and to said sealing rib of said sealing body when positioned at said end portion of the closure.

References Cited in the file of this patent

UNITED STATES PATENTS

| | | |
|---|---|---|
| 1,839,068 | Waschiczeck | Dec. 29, 1931 |
| 2,316,787 | Gould | Apr. 20, 1943 |
| 2,471,461 | Susskind | May 31, 1949 |

FOREIGN PATENTS

| | | |
|---|---|---|
| 227,784 | Switzerland | Sept. 16, 1943 |
| 949,273 | France | Aug. 25, 1949 |